(12) United States Patent (10) Patent No.: US 8,763,838 B2
Procunier et al. (45) Date of Patent: Jul. 1, 2014

| | |
|---|---|
| (54) LOCKING UTILITY PULL BOX LID | 220/327, 325, 323, 833–835; 70/164, 70/166–169; 404/25 |
| (71) Applicants: Ron Procunier, Peoria, AZ (US); Danny Jo King, Buckeye, AZ (US) | See application file for complete search history. |
| (72) Inventors: Ron Procunier, Peoria, AZ (US); Danny Jo King, Buckeye, AZ (US) | (56) References Cited U.S. PATENT DOCUMENTS |
| (*) Notice: Subject to any disclaimer, the term of this patent is extended or adjusted under 35 U.S.C. 154(b) by 0 days. | 2,810,401 A * 10/1957 Stansbury ............ 138/89 3,921,494 A * 11/1975 Coe ............ 411/344 6,029,709 A * 2/2000 Burgess ............ 138/89 6,811,119 B1* 11/2004 Petersen et al. ........ 244/114 R 7,176,376 B2* 2/2007 Stachowiak, Jr. ....... 174/50 8,347,670 B2 1/2013 Rix 2011/0203334 A1 8/2011 Rix |
| (21) Appl. No.: 13/739,684 | |
| (22) Filed: Jan. 11, 2013 | * cited by examiner |
| (65) Prior Publication Data US 2013/0180990 A1 Jul. 18, 2013 | *Primary Examiner* — Anthony Stashick *Assistant Examiner* — James Way (74) *Attorney, Agent, or Firm* — Schmesier, Olsen & Watts LLP |
| Related U.S. Application Data | (57) ABSTRACT |
| (60) Provisional application No. 61/585,950, filed on Jan. 12, 2012. | A locking utility pull box lid device is provided. The device includes a lid and two locking members that are rotatably coupled to a bottom surface of the lid. An actuator bolt extends through each lid aperture and each bolt engages an engagement plate of one locking member. The rotation of the bolt moves the bolt axially and in response, the locking member is rotated between a locked and unlocked position. |
| (51) Int. Cl. *B65D 17/52* (2006.01) | |
| (52) U.S. Cl. USPC ............ 220/284; 220/210; 404/25; 70/168 | |
| (58) Field of Classification Search USPC ......... 220/284, 210, 243, 245, 251, 262, 784, | 8 Claims, 6 Drawing Sheets |

LOCKING UTILITY PULL BOX LID

CROSS REFERENCE TO RELATED APPLICATION

This application claims priority to U.S. Provisional Patent Application to Ronald Procunier entitled "LOCKING UTILITY PULL BOX LID", Ser. No. 61/585,950, filed Jan. 12, 2012, the disclosure of which is hereby incorporated entirely herein by reference.

BACKGROUND OF THE INVENTION

1. Technical Field

This invention relates generally to a utility pull box lid and more particularly to a locking utility pull box lid.

2. State of the Art

Electrical systems, communication systems and the like utilize utility pull boxes in order to provide access to runs of cable. Utility pull boxes serve as an access point in long runs of cable to make it easier to perform maintenance or to pull the conductors from one end of the run to the other. By using utility pull boxes and breaking up the long run of cables, the user can pull conductors or cables to the point where the pull box is located, and then start a new pull from the box to the end of the run. This process assists in the passing of inspections when it comes to electrical or communication cables and the like.

Utility pull box lids have been employed to protect the cables from being damaged and to prevent the collection of debris in the utility pull box, among other reasons. These lids, however, have certain limitations. For example, these lids do not have a means to restrict access to the utility pull box. In addition, these lids are frequently subject to bending and/or breaking. Furthermore, these conventional utility pull box lids are not aesthetically pleasing.

DISCLOSURE OF THE INVENTION

The present invention relates to a locking pull box lid device, the device generally comprising a lid with a locking device, wherein the locking device operates to secure the lid to a utility pull box in order to reduce unauthorized entry to the utility pull box.

According to one embodiment of the locking pull box lid device, the device comprises a lid having a top surface, an opposing bottom surface, and two lid apertures extending from the top surface through the bottom surface of the lid. According to this embodiment, the device also comprises two brackets, each bracket comprising a channel between two bracket extensions, the two bracket extensions each comprising bracket apertures extending through each bracket extension, wherein the bracket apertures have aligned axes that are aligned along the channel. Each bracket is coupled to the lid adjacent a lid aperture with the axes of the bracket apertures substantially parallel to a side of the lid nearest the lid aperture. According to this embodiment, the device further comprises two actuator plates, each actuator plate having a threaded aperture, wherein each actuator plate is coupled to one bracket and configured such that the axis of the threaded aperture is aligned with the lid aperture adjacent the bracket.

According to this embodiment, the device further comprises a locking member. The locking member comprises a tube section, a base support plate having a first end and opposing second end and a first side and an opposing second side, wherein the first end of the base support plate is coupled to the tube section. The locking member further comprises a locking plate coupled to a second end and first side of the base support plate. The locking member further comprises an engagement plate coupled to the second side adjacent the first end of the base support plate, wherein the engagement plate extends away from the base support plate at an angle, wherein the angle is an obtuse angle when measured from the second end of the base support plate. The locking member further comprises an angle support plate, coupled on its edges between the base support plate and the engagement plate to provide strength and support during operation of the locking member. According to the present embodiment, the locking member is operatively coupled to the bracket. The tube section is sized and shaped to fit within the channel of the bracket, with the tube section axis aligned with the axes of the bracket apertures, such that a securing rod is secured through the bracket apertures and the tube section. The locking member is rotatable with respect to the bracket when it is operatively coupled to the bracket. According to the present embodiment, the locking member is coupled to the bracket with the engagement plate extending away from the side of the lid.

According to the present embodiment, the device further comprises two actuator bolts having a first end and opposing second end. The second end of each actuator bolt is inserted through a lid aperture and threadingly and operatively couples to the threaded aperture of an actuator plate. Rotation of the actuator bolt moves the bolt axially with respect to the actuator plate. The second end of the actuator bolt engages the engagement plate of the locking member, wherein the engagement of the actuator bolt and the engagement plate provides for movement of the locking member between a locked and unlocked position. The locking member is moved into the locked position in response to rotating the actuator bolt in a first direction and the locking member is moved into an unlocked position in response to rotating the actuator bolt in a second direction.

In one embodiment, the lid is placed on a utility pull box, wherein an edge of the lid rests on a rabbet-type ledge of the utility pull box with the bottom side of the lid facing down into the box and the top side of the lid facing up away from the box, such that the top of the lid is accessible external to the utility pull box. When the locking member is moved into the locked position, the locking plate engages the ledge of the utility pull box and becomes resistant to removal. When the locking member is moved into the unlocked position, the lid is allowed to easily be removed from the box.

In an embodiment in which a utility pull box is located in or on a ground surface, the locking member is operable due in part to gravitation forces providing the proper engagement of the actuator bolt with the engagement plate of the locking member. In this embodiment, the geometry of the locking member is such that the gravitation force biases the locking plate coupled to the base support plate downward. This results in the engagement plate being biased toward the actuator bolt because of the rotation of the locking member with respect to the bracket. Accordingly, in this embodiment, the rotation of the actuator bolt in the first direction moves the actuator bolt down and engages the engagement plate, resulting in the rotation of the locking member, until the locking plate engages the ledge of the utility pull box. Rotating the actuator bolt in the second direction moves the actuator bolt up such that gravitational force acts on the locking plate and biases it downward. This biases the engagement plate toward the actuator bolt, resulting in the rotating of the locking member until the locking plate no longer engages the ledge of the utility pull box, allowing removal of the lid.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1A:
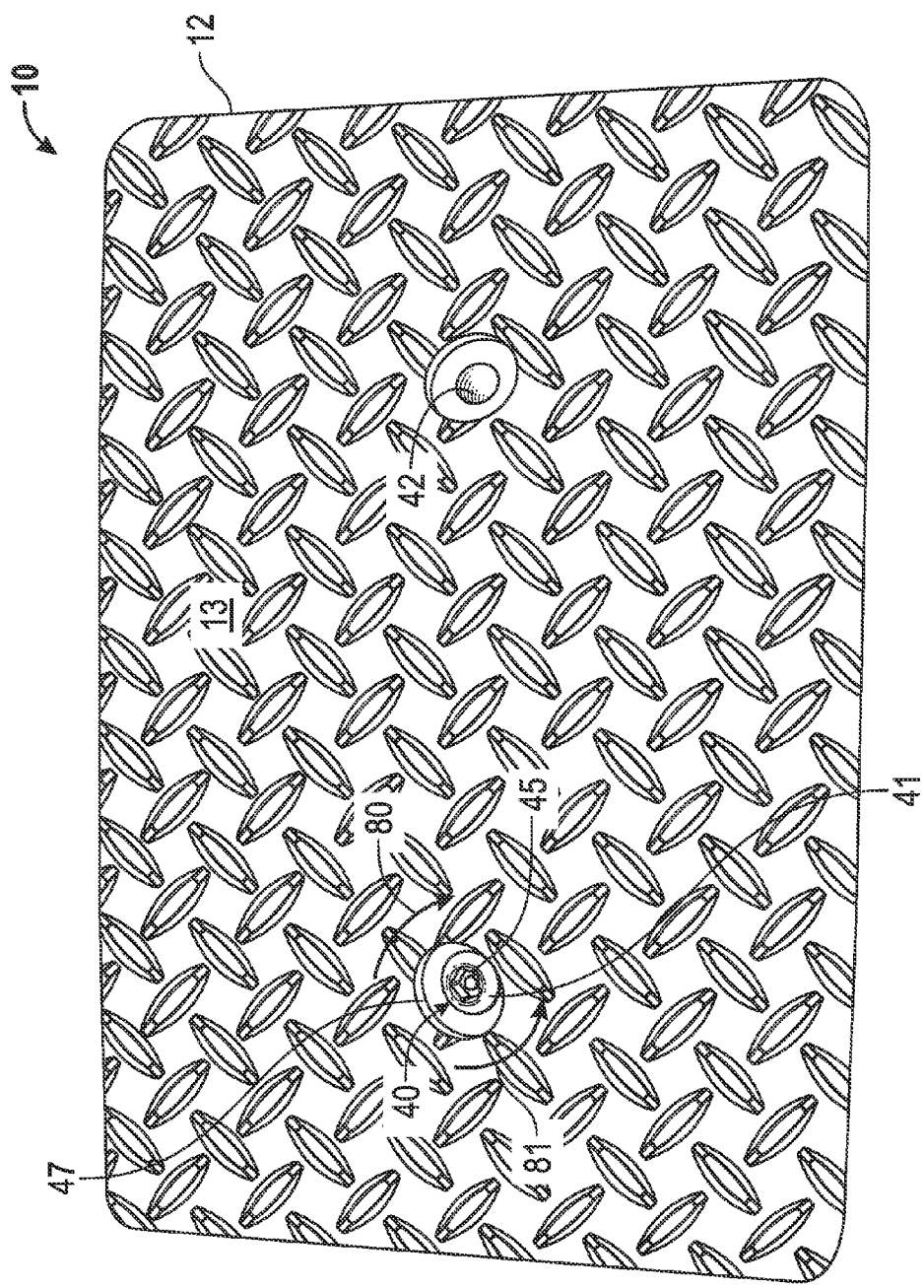
FIG. 1A is a top view of a lid of a locking utility pull box lid device, according to a first embodiment of the invention.
Figure 1B:
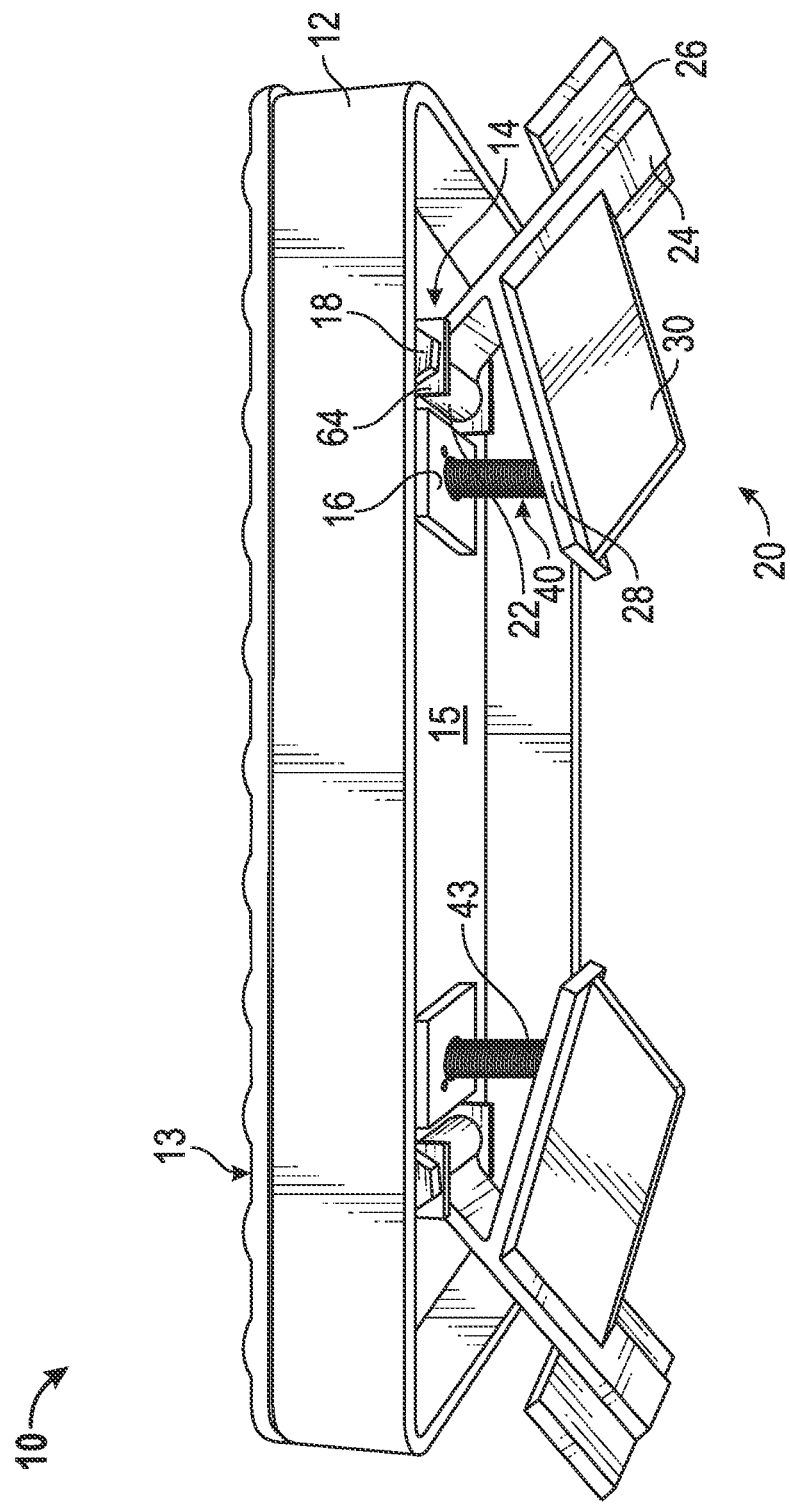
FIG. 1B is a side view of a lid of a locking utility pull box lid device, according to a first embodiment of the invention.

As discussed above, embodiments of the present invention relate to a locking utility pull box lid device. The device includes a lid having apertures extending from the top to the bottom of the lid, and two locking members that are rotatably coupled to a bottom surface of the lid. An actuator bolt extends through each lid aperture and each bolt engages an engagement plate of one locking member. The rotation of the bolt moves the bolt axially, and in response, the locking member is rotated between a locked and unlocked position.

Referring to FIGS. 1A-1E, a first embodiment of a locking utility pull box lid device 10 is generally depicted. According to this first embodiment, device 10 comprises a lid 12 made of metal and having a top surface 13, an opposing bottom surface 15 and two lid apertures 42, extending from the top surface 13 through the bottom surface 15 of the lid 12. According to the present embodiment shown in FIGS. 1A-1E, the lid 12 is of a rectangular shape. In alternate embodiments, the lid 12 may be rectilinear in shape. In the present embodiment, the lid 12 further comprises side members 17 coupled at opposing edges of the lid 12, and side members 19 on other opposing edges of the lid 12. The side members 17 and 19 extend away from the bottom surface 15 in a direction transverse to the bottom surface 15. In the present embodiment, side members 17 and 19 extend downward from lid 12, and are perpendicular to the bottom surface 15 of lid 12, and the length of side members 17 is less than the length of side members 19. The width and depth of the side members 17 and 19 correspond to the size and shape of the utility pull box (not shown) on which the lid 12 may be used, such that the side members 17 and 19 may extend down into the utility pull box.

Figure 1C:
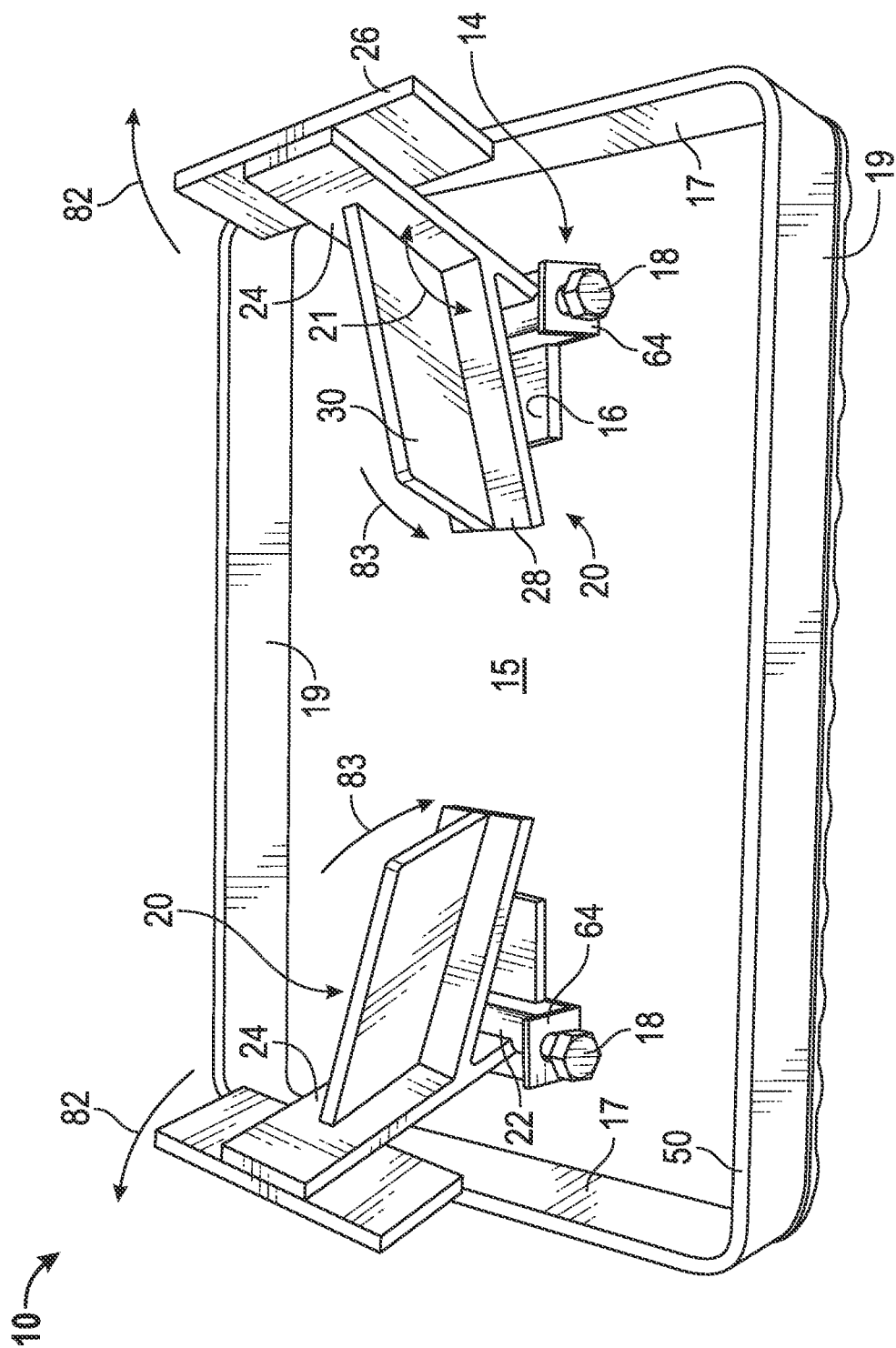
FIG. 1C is a bottom view of a lid of a locking utility pull box lid device, according to a first embodiment of the invention.
Figure 1D:
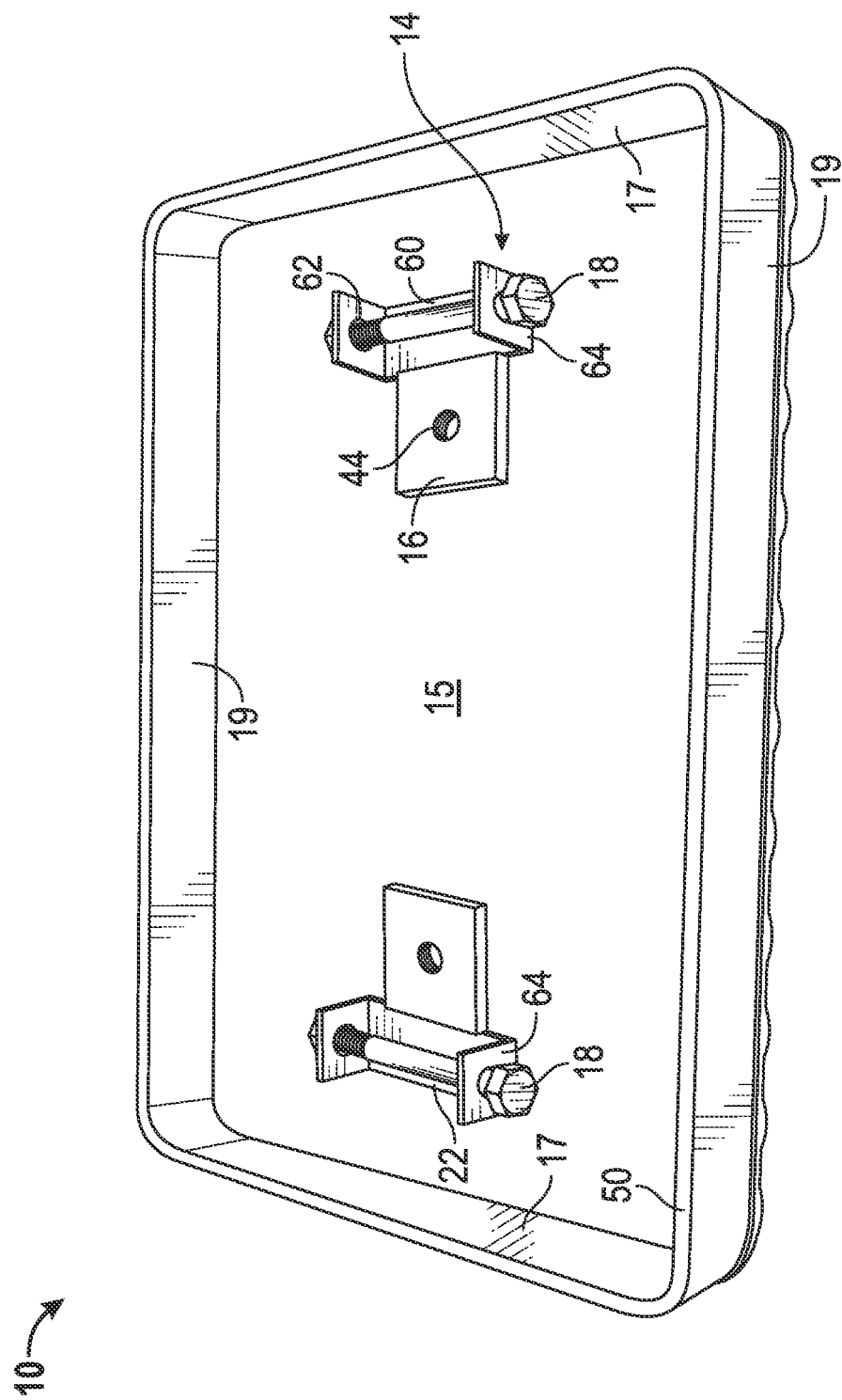
FIG. 1D is a bottom view of a lid of a locking utility pull box lid device, according to a first embodiment of the invention.
Figure 1E:
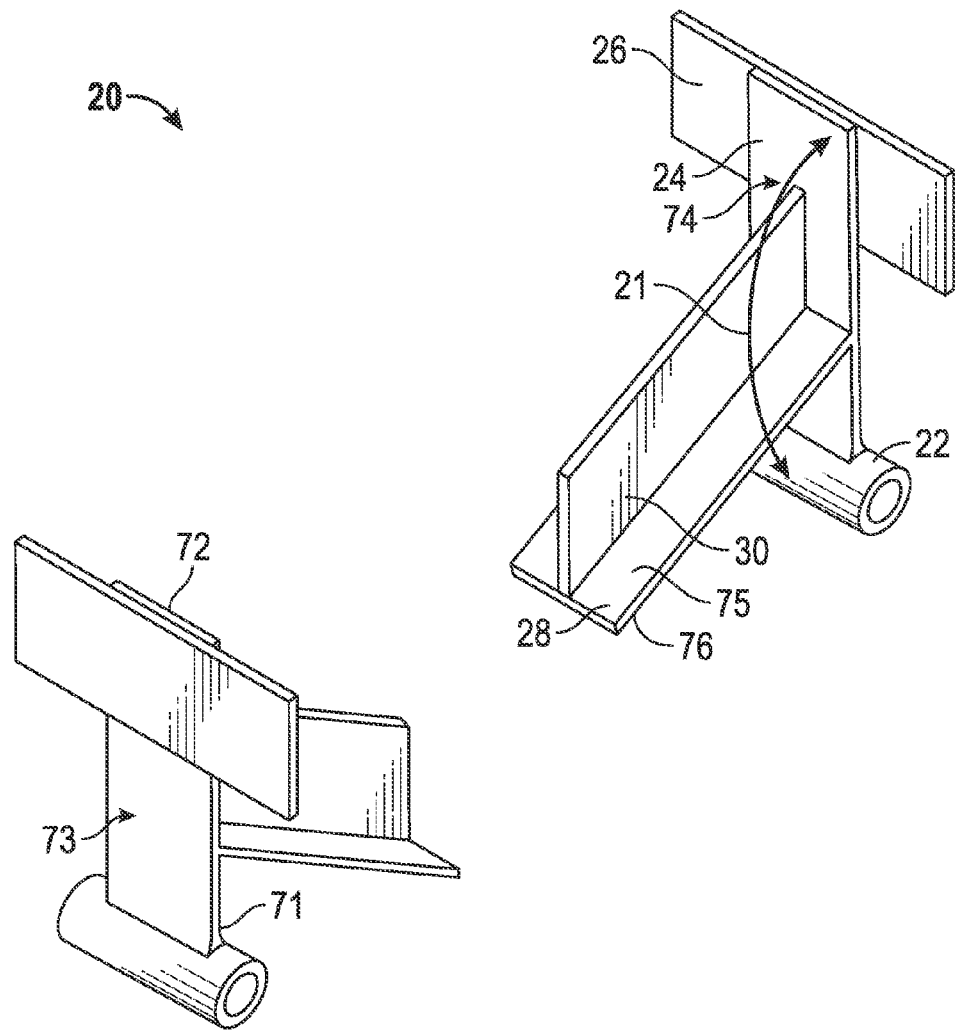
FIG. 1E is a view of locking members of a utility pull box lid device, according to a first embodiment of the invention.

According to the present first embodiment, the device 10 also comprises two brackets 14, with each bracket 14 comprising a channel 60 between two bracket extensions 64. In the present embodiment, the faces of the bracket extensions 64 are perpendicular to the exposed faces of the brackets 14 and the bottom 15 of the lid 12. Each bracket extension 64 comprises a bracket aperture 62 formed through it. On each bracket 14, the bracket apertures 62 of the extensions 64 have aligned axes that align with the channel 60 such that a rod or bolt placed through both bracket apertures 62 of the bracket extensions 64 of a bracket 14 will have its axis aligned along the channel 60. Each bracket 14 is coupled to the lid 12 adjacent a lid aperture 42 and between the lid aperture 42 and a side member of the lid 12 closest to the lid aperture 42. The bracket 14 is aligned such that the axis extending through the bracket apertures 62 and along the channel 60 between the two bracket extensions 64 is substantially parallel to a side member of the lid 12 nearest the lid aperture 42. According to the present embodiment, FIG. 1C depicts the nearest side member of the lid 12 to be side 17 rather than side member 19.

According to the present embodiment, the device 10 further comprises two actuator plates 16, with each actuator plate 16 having a threaded aperture 44. In the present embodiment, each actuator plate 16 is coupled to a bracket 14. In an alternate embodiment, the actuator plate 16 is integral to the bracket 14 such that the bracket 14 and the actuator plate 16 form one unitary piece. In the present embodiment, the actuator plate 16 is configured such that the axis of the threaded aperture 44 is aligned with the axis of the lid aperture 42 adjacent the bracket 14, such that a rod or bolt may be extended through the lid aperture 42 and the threaded aperture 44.

According to the present embodiment, the device 10 further comprises at least one locking member 20. The locking member 20 comprises a tube section 22, a base support plate 24 having a first end 71 and opposing second end 72 and a first side 73 and an opposing second side 74. The first end 71 of the base support plate 24 is coupled to the tube section 22. The locking member 20 further comprises a locking plate 26 coupled to the first side 73 of the base support plate 24 near the second end 72 of the base support plate 24. The locking member 20 further comprises an engagement plate 28 having a first side 75 and a second opposing side 76. The engagement plate 28 is coupled to the second side 74 of the base support plate 24 adjacent the first end 71 of the base support plate 24. Engagement plate 28 is configured such that the engagement plate 28 extends away from the base support plate 24 at an angle 21 measured between the second side 74 of base support plate 24 and the first side 75 of the engagement plate 28. According to the present embodiment, the angle 21 is an obtuse angle. Locking member 20 further comprises an angle support plate 30, coupled on its edges between the second side 74 of base support plate 24 and the first side 75 of engagement plate 28 to provide strength and support during operation of the locking member 20.

According to the present embodiment, tube section 22 of locking member 20 is sized and shaped to fit within and along the channel 60 of the bracket 14, with the tube section 22 axis aligned along the axes of the bracket apertures 62, such that a securing rod 18 extends through the bracket apertures 26 and the tube section 22, securing the locking member 20 to bracket 14. In the present embodiment, locking member 20 is operatively coupled to bracket 14 by means of rod 18, such that locking member 20 is rotatable with respect to the bracket 14. According to the present embodiment, locking member 20 is coupled to the bracket 14 such that the end of engagement plate 28 that is not secured to base support plate 24 extends away from the side member 17 of the lid 12, and toward the center of the lid 12. In alternate embodiments, rod 18 may be a bolt.

According to the present embodiment, device 10 further comprises two actuator rods 40 configured to actuate the movement of the locking member 20 between locked and unlocked positions. In the present embodiment, actuator rods 40 are actuator bolts. The actuator bolts 40 have a first end 41 and opposing second end 43. In the present embodiment, the second end 43 of each actuator bolt 40 is inserted through a lid aperture 42 and threadingly and operatively couples to the threaded aperture 44 of the actuator plate 16. Rotation of the actuator bolt 40 moves the actuator bolt 40 axially with respect to the threaded aperture 44 of the actuator plate 16. When actuator bolt 40 is rotated such that at least a portion of the second end 43 of the actuator bolt 40 has passed through the lid 12 and the actuator plate 16, the second end 43 of the actuator bolt 40 is configured to contact and engage the engagement plate 28 of the locking member 20. Engagement of the actuator bolt 40 with the engagement plate 28 allows for movement of the locking member 20 between a locked and unlocked position. In the present embodiment, locking member 20 is moved into the locked position in response to a rotation of the actuator bold 40 in a first (clockwise) direction 80. Locking member 20 is moved into an unlocked position in response to a rotation of the actuator bolt 40 in a second (counterclockwise) direction 81.

According to the present embodiment, the first end 41 of the actuator bolt 40 includes a security keyed head 45. Security keyed head 45 is formed such that a certain type of keyed wrench fits into the keyed head 45. By using security keyed head 45, locking utility pull box lid device 10 functions to deter and reduce the possibility of unauthorized lid opening. The keyed head 45 allows only those with the corresponding keyed wrench to engage the keyed head 45 and rotate the actuator bolt 40 to unlock the locking utility pull box lid.

According to the present embodiment, the lid 12 is placed on a utility pull box (not shown), such that an edge 50 of the lid 12 rests on a rabbet-type ledge of the utility pull box, and such that the bottom surface 15 of the lid 12 faces down into the box interior and the top surface 13 of the lid 12 faces up away from the box, leaving the top 13 of the lid 12 accessible. When the locking members 20 are moved into the locked position by rotating the actuator bolts 40 in a clockwise direction 80, the locking plates 26 move outward in a first direction 82, engaging the ledge of the utility pull box and making the lid 12 resistant to removal. When the locking member 20 is moved into the unlocked position by rotating the actuator bolts 40 in a counterclockwise direction 81, the locking plates 26 move inward in a second direction 83, disengaging from the ledge of the utility pull box and allowing the lid 112 to be easily be removed from the box.

In the present embodiment, when the lid 12 is used on utility pull box located in or on a ground surface (such that the bottom surface 15 of the lid 12 faces the ground), the configuration of locking member 20 allows locking member to be operable in part due to gravitational force. The gravitational force helps provide proper engagement of the actuator bolt 40 with the engagement plate 28 of the locking member 20. In the present embodiment, the geometric configuration of the locking member 20 is such that when the bottom surface 15 of the lid 12 faces the ground, gravitational force biases the locking plate 26 coupled to the base support plate 24 in a direction 83 toward the center of the lid 12. This biasing of the locking plate 26 downward (in a direction 83 toward the center of the lid 12) results in the engagement plate 28 being biased toward the actuator bolt 40 because of the rotation of the locking member 20 with respect to the bracket 14. Accordingly, in the present embodiment, rotating actuator bolts 40 in a first (clockwise) direction 80 moves the actuator bolts 40 down such that the second ends 43 of the actuator bolts 40 engage the engagement plates 28. This results in the rotation of the locking members 20 in an outward direction 82, until the locking plates 26 engage the ledges of the utility pull box. Rotating the actuator bolts 40 in a second (counterclockwise) direction 81 moves the actuator bolts 40 up, such that gravitational force acts on the locking plates 26 and biases them downward, thereby biasing the engagement plates 28 toward the actuator bolts 40. This results in the rotating of the locking members 20 in an inward direction 83. When locking members 20 have rotated sufficiently such that the locking plates 26 no longer engage the ledge of the utility pull box, the lid 12 may be removed. In the present embodiment, the locking members 20 rotate in a first direction 82 in response to rotation of their respective actuator bolts 40 in a first (clockwise) direction 80. The locking members 20 rotate in a second direction 83 in response to rotation of their respective actuator bolts 40 in the second (counterclockwise) direction 81.

In the present embodiment, the locking plates 26 are sized to extend beyond the edges of the base support plate 24. This allows for a greater surface area to engage the ledge of the utility pull box in order to provide better locking ability of the locking member 20.

In an alternate embodiment, the locking member 20 utilizes a spring, such as, for example, a torsion spring, to bias the engagement plate 28 toward the actuator bolt 40. This may be beneficial in instances where the utility pull box and the lid 12 are angled.

Figure 2:
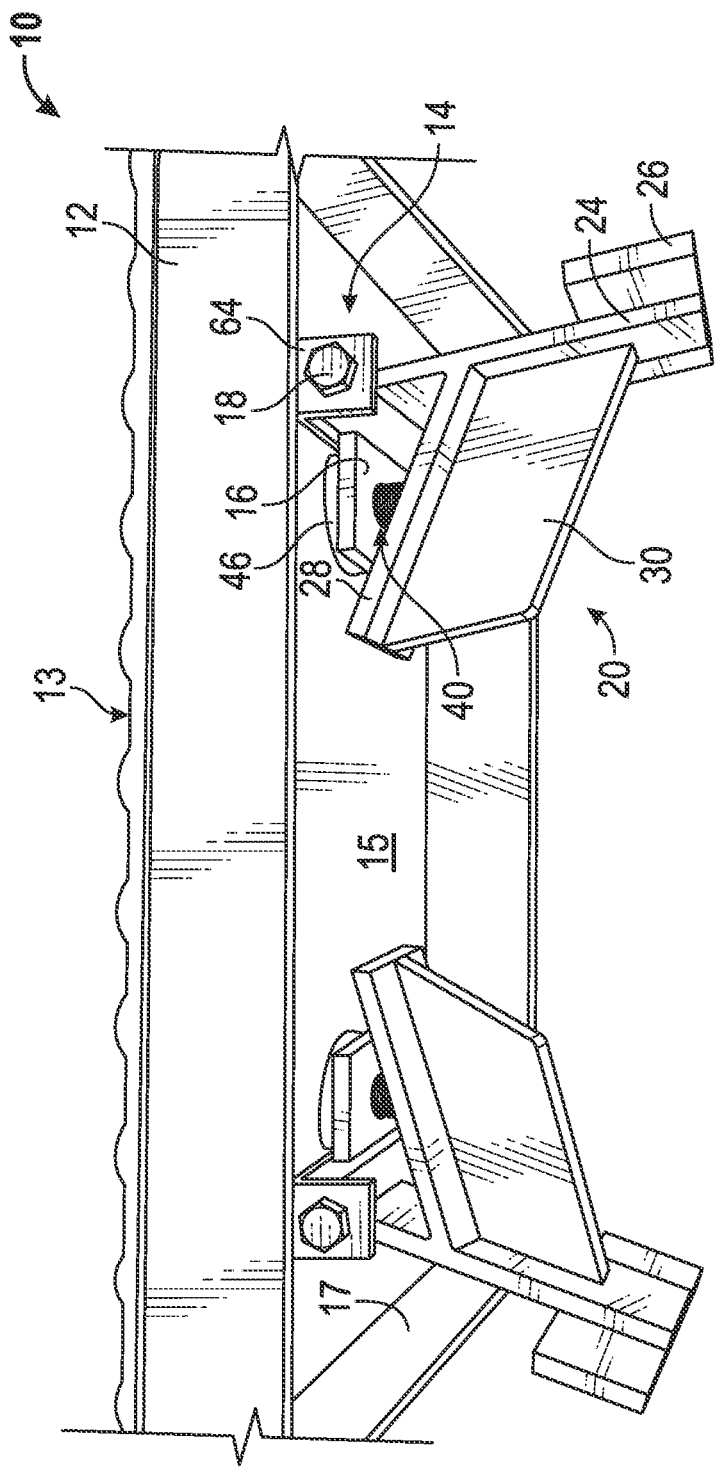
FIG. 2 is a side view of a locking utility pull box lid device, according to a second embodiment of the invention.

In yet another alternate embodiment, generally illustrated in FIG. 2, a tube member 46 extends at least partially through the lid aperture 44 and the bottom surface 15 of the lid 12, and is coupled both to the inside surface of the lid aperture 42 and to the actuator plate 16. Tube member 46 is sized such that an actuator bolt 40 fits within the tube member 46, allowing actuator bolt 40 to contact the threaded aperture 44 of the actuator plate 16. In this alternate embodiment, tube member 46 serves to keep the actuator plate from moving, bending or the like and further helps to avoid misaligning the axis of the threaded aperture 44 and the axis of the lid aperture 42.

In yet another alternate embodiment, locking utility pull box lid device 10 comprises a lid 12 made of metal and having a top surface 13, an opposing bottom surface 15 and one lid aperture 42, extending from the top surface 13 through the bottom surface 15 of the lid 12. In this alternate embodiment, device 10 comprises one bracket 14 coupled to the lid 12, one actuator plate 16 coupled to the bracket 14, one locking member 20 operatively coupled to the bracket 14 with a rod 18, and one actuator bolt 40 extending through aperture 42 into bracket 14 to operate locking member 20.

In another alternate embodiment, the lid 12 is made of ¼" thick galvanized steel, with side members 19 having a length of 15¼" and side members 17 having a length of 10". In this embodiment, side members 17 and 19 are a continuous steel band encompassing the perimeter of the lid 12. In this embodiment, the actuator bolt 40 is a ½" 13×1½" high-security washer head made of stainless steel. This alternate embodiment further includes a tube member 46 that is made from 1¼"×½" steel pipe. It should be appreciated that in alternate embodiments, side members 19 and 17 may have longer or shorter lengths, and may not be formed of one continuous band.

In still other embodiments, various elements of the locking utility pull box lid device may be formed of any of many different types of materials or combinations thereof that can readily be formed into shaped objects provided that the components selected are consistent with the intended operation of a locking utility pull box lid device. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

In still other alternate embodiments, the components of locking utility pull box lid device 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof.

In still other alternate embodiments, the locking utility pull box lid device 10 may be manufactured using additional steps of sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A locking box lid device comprising:
    a lid comprising a top surface, a bottom surface, a first lid aperture extending through the top surface, the lid and the bottom surface, and a second lid aperture extending through the top surface, the lid and the bottom surface;
    a first bracket coupled to the bottom surface of the lid adjacent to said first lid aperture, said first bracket comprising two bracket extensions separated by a channel, each bracket extension having a bracket aperture;
    a second bracket coupled to the bottom surface of the lid adjacent to said second lid aperture, said second bracket comprising two bracket extensions separated by a channel, each bracket extension having a bracket aperture;
    a first actuator plate coupled to said first bracket and having a threaded aperture, wherein said first actuator plate is positioned such that said threaded aperture is substantially aligned with said first lid aperture;
    a second actuator plate coupled to said second bracket and having a threaded aperture, wherein said second actuator plate is positioned such that said threaded aperture is substantially aligned with said second lid aperture;
    a first locking member comprising a tube section, a base support plate coupled to the tube section, a locking plate coupled to a first side of the base support plate near a second end of the base support plate, an engagement plate coupled to a second side of the base support plate adjacent a first end of the base support plate, wherein said tube section fits within and along said channel of said first bracket;
    a second locking member comprising a tube section, a base support plate coupled to the tube section, a locking plate coupled to a first side of the base support plate near a second end of the base support plate, an engagement plate coupled to a second side of the base support plate adjacent a first end of the base support plate, wherein said tube section fits within and along said channel of said second bracket;
    a first rod extending through the bracket apertures of said first bracket and the tube section of said first locking member, wherein said first rod secures the tube section between the bracket apertures and operatively couples said first locking member to said first bracket;
    a second rod extending through the bracket apertures of said second bracket and the tube section of said second locking member, wherein said second rod secures the tube section between the bracket apertures and operatively couples said second locking member to said second bracket;
    a first actuator bolt having an end configured to extend through said first lid aperture, rotatably thread through the threaded aperture of said first actuator plate, and contact the engagement plate of said first locking member; and
    a second actuator bolt having an end configured to extend through said second lid aperture, rotatably thread through the threaded aperture of said second actuator plate, and contact the engagement plate of said second locking member.

2. The locking box lid device of claim 1, wherein at least one of said first and second actuator bolts comprises a security feature to limit devices that can rotate said at least one bolt.

3. The locking box lid device of claim 1, wherein at least one of said first and second actuator bolts comprises a security keyed head.

4. The locking box lid device of claim 1, wherein at least one of said first and second rods is a bolt.

5. The locking box lid device of claim 1, wherein the angle formed between the closest surfaces of the engagement plate and base support plate of at least one of said first locking member and said second locking member is an obtuse angle.

6. The locking box lid device of claim 1, further comprising an angle support plate coupled between the base support plate and engagement plate of at least one of said first and second locking members.

7. The locking box lid device of claim 1, wherein the edges of the locking plate of at least one of said first and second locking members extend beyond the edges of the base support plate to which the locking plate is coupled.

8. The locking box lid device of claim 1, wherein at least one of said first and second actuator bolts comprises a security keyed head.

* * * * *